W. B. SMITH.
PEDIMOTIVE PROPELLING GEAR FOR BICYCLES, VELOCIPEDES, AND THE LIKE.
APPLICATION FILED AUG. 21, 1917.

1,349,588.

Patented Aug. 17, 1920.
2 SHEETS—SHEET 1.

INVENTOR:
W. B. SMITH
By John O. Seifert
His Atty.

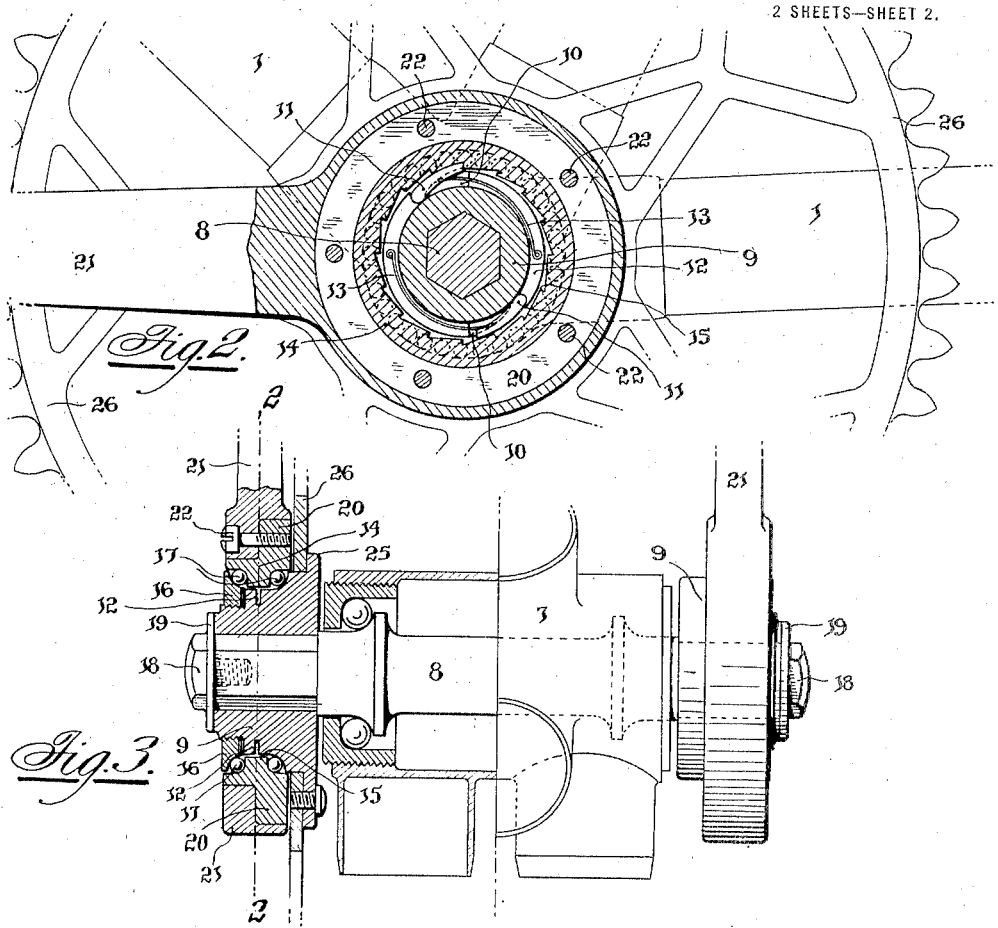

UNITED STATES PATENT OFFICE.

WILFRED BANKS SMITH, OF HOBART, TASMANIA, AUSTRALIA.

PEDIMOTIVE PROPELLING-GEAR FOR BICYCLES, VELOCIPEDES, AND THE LIKE.

1,349,588.  Specification of Letters Patent.  Patented Aug. 17, 1920.

Application filed August 21, 1917. Serial No. 187,496.

*To all whom it may concern:*

Be it known that I, WILFRED BANKS SMITH, a subject of the King of Great Britain, residing at 10 Antill street, Hobart, in the State of Tasmania, Commonwealth of Australia, clerk, have invented certain new and useful Improvements in Pedimotive Propelling-Gears for Bicycles, Velocipedes, and the like, of which the following is a specification.—

This invention relates to improvements in pedimotive propelling gear of bicycles, velocipedes and the like and it has been devised in order to provide simple and efficient mechanism whereby greater motive power can be obtained from a given effort on the part of the rider than is possible with the present arrangement of pedal and crank device now in ordinary use. The invention, moreover, has been designed whereby power can be continuously applied to the propelling gear thereby obviating the loss of power at present experienced with the ordinary gear when the pedal cranks are in or near their vertical positions during rotation.

According to the present invention a pedal lever is fitted to each end of the axle of the driving sprocket by means of free wheel mechanism and a sprocket on said axle is connected by chain and intermediate gearing to a sprocket fitted to the hub or axle of the driving wheel of a cycle or the like.

The ends of the pedal levers are fitted with pedals and are suitably connected to permit of them being alternately operated practically in a vertical direction by a downward movement of the rider's legs, thereby permitting power to be applied continuously to the propelling gear.

In order that the invention may be readily understood reference will now be had to the accompanying sheets of explanatory drawings, wherein—

Fig. 2 is a view in sectional side elevation of the free wheel connection between a pedal lever and the axle of the driving sprocket, taken on the dotted line 2—2 of Fig. 3.

Fig. 3 is a view in plan, partly in section, of a bracket carrying the axle of the driving sprocket and shows clearly the manner of connecting the pedal levers to the axle.

Fig. 4 is a view in sectional front elevation of part of a bearing carrying the intermediate gear and shows clearly the manner of fitting a sprocket to an axle of the same, and Fig. 5 is a view in sectional side elevation of the bearing, taken on the dotted line 5—5 of Fig. 4.

Figure 1:
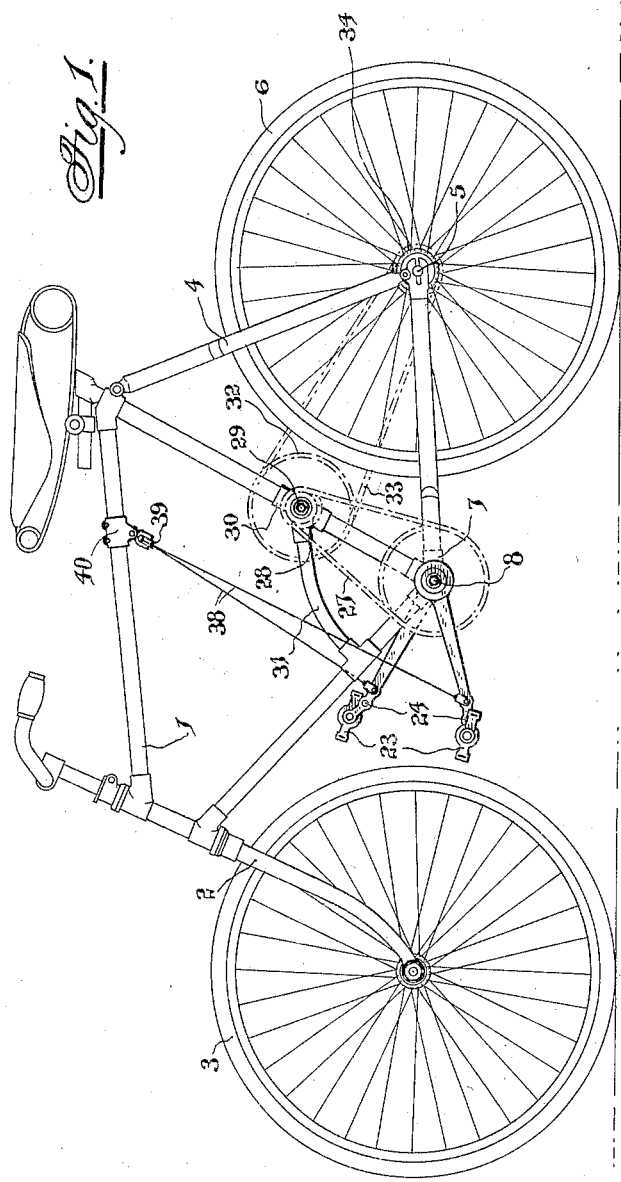
Figure 1 is a view in side elevation of an ordinary bicycle fitted with propelling gear constructed in accordance with the invention.

In these drawings like characters of reference have been employed to indicate similar parts in the different views and the numeral 1 designates the frame of an ordinary bicycle which is provided on its front end with a steering fork 2 carrying a front wheel 3. The back fork 4 of the frame carries an axle 5 upon which is carried a driving wheel 6 in the ordinary way.

The bracket 7 carries in the ordinary way an axle 8 the ends of which are squared or given any number of flat sides and fitting thereover are circular blocks 9 which are designed to form the inner or fixed member of the free wheel mechanism. The ends of the axle 8 and the holes in the circular blocks 9 are preferably tapered to insure the latter having a tight fit on the former. The outer peripheries of the circular blocks 9 are formed with recesses 10 to accommodate pawls 11 and grooves 12 to accommodate springs 13 for exerting an outward pressure on the free ends of the pawls.

An annular ring 14 having internal ratchet teeth 15 fits neatly over each of the circular blocks 9 and these rings 14 are retained in position thereon by collars 16 which screw on the outer ends of the said blocks.

Ball bearings 17 are located between the annular rings 14 and the circular blocks 9 and collars 16 to provide freedom of movement of the said annular collars which form the outer members of the free wheel mechanism. The circular blocks 9 are retained on the ends of the axle 8 by means of set screws 18 and washers 19 or by any other approved means.

The annular rings 14 are formed with peripherally disposed flanges 20 which fit neatly within recesses formed in the enlarged ends of pedal levers 21 which are shaped to fit around the said rings. The enlarged ends of the pedal levers are secured rigidly to the flanges on the annular rings by means of set screws 22 or other approved devices.

The free ends of the pedal levers are curved upwardly and provided with foot pedals 23 of ordinary design and a plurality of holes 24 can be formed in said pedal levers to permit of the foot pedals being adjusted thereon to obtain a greater or lesser power from the efforts of a rider.

A peripheral flange 25 is formed on the inner end of one of the circular blocks 9 and to this flange is bolted or otherwise secured a driving sprocket 26 which is connected by a chain 27 to a small sprocket 28 fitted to an axle 29 mounted in a bearing 30 fitted to the diagonal bar of the bicycle frame.

The bearing 30 is located above the bracket 7 and the frame is strengthened by a bar 31 as shown in Fig. 1 of the drawings.

The nave of the sprocket 28 is shaped to fit neatly over one end of the axle 29 and is retained thereon in a manner similar to which the circular blocks 9 are fitted to and retained on the ends of the axle 8. The end of the axle 29 opposite that fitted with the small sprocket 28 is fitted in a like manner with a larger sprocket 32 which is connected by a chain 33 to a small sprocket 34 fitted to the hub of the driving wheel 6.

The bearing 30 for the axle 29 is provided with an eccentric bush 35 which is provided with a projection 36 for convenience of rotation when it is desired to adjust the tension of the chain 27 to compensate for any wear or stretching of the same. The bearing 30 is split at the ends and provided with tightening screws 37 constructed and arranged in the ordinary way and the said screws are loosened when it is desired to adjust the eccentric bush and tightened when the said bush has been moved into a desired position. The method of adjusting the tension on the chain 27 is shown by way of example only as it will be readily obvious that various modifications of the device will readily suggest themselves to persons skilled in the art to which the invention relates. The tension of the chain 33 can be adjusted by moving the axle 29 in any well known way.

The ends of a flexible member 38—such as a chain or steel rope—are connected to the pedal levers 21 and the said member is arranged to pass over a pulley 39 which is carried by a clamp 40 adjustably secured to the top bar or saddle bracket of the frame. The flexible member connecting the pedal levers as above described insures both pedal levers operating in perfect unison and in opposite directions when pressure is applied to one of the pedals by the effort of a rider.

In operation the rider presses downward on one of the pedals in practically a vertical direction thereby causing the axle 8 and sprocket wheel 26 to revolve and impart movement through the chain and intermediate gearing to the driving wheel of the bicycle. The downward movement of a pedal lever causes the opposite pedal lever to move freely upward until the rider transfers pressure to the pedal thereon when it in turn is pressed downwardly thereby causing the free wheel mechanism to act on that end of the axle 8. The pedal levers can be of any desired length and they can be oscillated over various arcs of movement thus permitting of long or short movements of the legs according to the will of the rider.

The object of the intermediate gear is to effect an increase in the speed obtainable from a given rate of movement of the pedal levers and the gain in power over the ordinary crank driven mechanism is obtained by obviating any loss or delay in the application of power to the pedal levers such as is occasioned when the pedal cranks are at or near their vertical positions.

The employment of an intermediate gear obviates the necessary alternative of using an excessively large driving sprocket with its attendant disadvantage of buckling under slight strains, although when a low gear is required the intermediate gear can be dispensed with and the driving wheel can then be driven direct from the said sprocket.

Although the invention has been described with reference to its application to an ordinary bicycle it will be readily understood that such modifications necessary to adapt it to velocipedes and like vehicles may well fall within the scope thereof and therefore I do not wish to be understood as limiting myself to the precise arrangement described and illustrated.

What I do claim is:—

In a propelling gear for bicycles and the like, an axle rotatively mounted in a bearing in the frame, circular blocks detachably secured to the ends of the axle, a sprocket wheel connected to one of the blocks, spring actuated pawls pivotally mounted in an annular recess in the blocks, rings revolubly mounted on the circular blocks, said blocks and rings being arranged to constitute races for balls, ratchet teeth on the inner periphery of the rings, pedal levers fixed to the rings, a second bearing in a bracket on the frame of the bicycle, an axle in said bearing, a small and a large sprocket on opposite ends of the axle, a chain connecting the small sprocket to the sprocket on the axle carrying the pedal levers, and a chain connecting the large sprocket to a sprocket on the axle or hub of the driving wheel, as and for the purpose specified.

In testimony whereof I affix my signature in presence of two witnesses.

WILFRED BANKS SMITH.

Witnesses:
M. ROSSITER,
A. J. CALLINAN.